United States Patent
Webb et al.

(10) Patent No.: US 7,893,393 B2
(45) Date of Patent: *Feb. 22, 2011

(54) SYSTEM AND METHOD FOR CALIBRATING AN IMAGE PROJECTION SYSTEM

(75) Inventors: Stephen B. Webb, Louisville, KY (US); Christopher O. Jaynes, Lexington, KY (US)

(73) Assignee: Mersive Technologies, Inc., Lexington, KY (US)

(*) Notice: Subject to any disclaimer, the term of this patent is extended or adjusted under 35 U.S.C. 154(b) by 975 days.

This patent is subject to a terminal disclaimer.

(21) Appl. No.: 11/737,821

(22) Filed: Apr. 20, 2007

(65) Prior Publication Data

US 2008/0129967 A1    Jun. 5, 2008

Related U.S. Application Data

(60) Provisional application No. 60/745,343, filed on Apr. 21, 2006.

(51) Int. Cl.
*H01L 27/00* (2006.01)
*G03B 21/00* (2006.01)
*G03B 21/14* (2006.01)

(52) U.S. Cl. ............ 250/208.1; 353/121; 353/48; 353/69

(58) Field of Classification Search ........... 353/94, 353/70, 30, 79, 121, 122, 48, 69; 348/745, 348/806; 345/1.3, 629, 630; 382/274, 293, 382/295; 700/30, 98; 250/208.1
See application file for complete search history.

(56) References Cited

U.S. PATENT DOCUMENTS 4,974,073 A    11/1990    Inova
(Continued)

FOREIGN PATENT DOCUMENTS

JP    2007180979 A    7/2007
(Continued)

OTHER PUBLICATIONS

International Search Report and Written Opinion dated Nov. 20, 2009 pertaining to International application No. PCT/US2009/040977.
(Continued)

*Primary Examiner*—Que T Le
*Assistant Examiner*—Pascal M Bui-Pho
(74) *Attorney, Agent, or Firm*—Lathrop & Gage LLP

(57) ABSTRACT

A method and system for calibrating and operating projection systems where one or more projectors are utilized to project an image. One or more projectors are oriented to project an image on a projection screen and one or more image sensors are oriented to acquire the projected image. Three-dimensional position coordinates of the respective image fiducials as projected on the screen are identified by applying three-dimensional mapping functions to represent the manner in which two-dimensional points in a projector frame map to three-dimensional points on the projection screen. Parametric functions are fit to a neighborhood of points representing the three-dimensional image fiducial position coordinates and corresponding parametric models are generated. The projectors are then operated in accordance with geometric calibration data generated from validation and correction of the fiducial coordinates.

17 Claims, 5 Drawing Sheets

U.S. PATENT DOCUMENTS

| | | | |
|---|---|---|---|
| 5,136,390 | A | 8/1992 | Inova et al. |
| 5,734,446 | A | 3/1998 | Tokoro et al. |
| 6,115,022 | A * | 9/2000 | Mayer et al. ............... 345/418 |
| 6,222,593 | B1 | 4/2001 | Higurashi et al. |
| 6,434,265 | B1 | 8/2002 | Xiong et al. |
| 6,456,339 | B1 * | 9/2002 | Surati et al. ............... 348/745 |
| 6,480,175 | B1 | 11/2002 | Schneider |
| 6,545,685 | B1 | 4/2003 | Dorbie |
| 6,570,623 | B1 | 5/2003 | Li et al. |
| 6,590,621 | B1 | 7/2003 | Creek et al. |
| 6,633,276 | B1 | 10/2003 | Jaynes |
| 6,695,451 | B1 | 2/2004 | Yamasaki et al. |
| 6,733,138 | B2 | 5/2004 | Raskar |
| 6,753,923 | B2 | 6/2004 | Gyoten |
| 6,804,406 | B1 | 10/2004 | Chen |
| 6,814,448 | B2 | 11/2004 | Ioka |
| 6,819,318 | B1 | 11/2004 | Geng |
| 7,097,311 | B2 | 8/2006 | Jaynes et al. |
| 7,119,833 | B2 | 10/2006 | Jaynes et al. |
| 7,133,083 | B2 | 11/2006 | Jaynes et al. |
| 7,266,240 | B2 | 9/2007 | Matsuda |
| 7,307,690 | B1 | 12/2007 | De Winter et al. |
| 2002/0024640 | A1 | 2/2002 | Ioka |
| 2002/0041364 | A1 | 4/2002 | Ioka |
| 2004/0085477 | A1 | 5/2004 | Majumder et al. |
| 2004/0169827 | A1 | 9/2004 | Kubo et al. |
| 2004/0239885 | A1 | 12/2004 | Jaynes et al. |
| 2005/0287449 | A1 | 12/2005 | Matthys et al. |
| 2007/0188719 | A1 | 8/2007 | Jaynes et al. |
| 2007/0195285 | A1 * | 8/2007 | Jaynes et al. ............... 353/69 |
| 2007/0242240 | A1 | 10/2007 | Webb et al. |
| 2007/0268306 | A1 | 11/2007 | Webb et al. |
| 2007/0273795 | A1 | 11/2007 | Jaynes et al. |
| 2008/0024683 | A1 | 1/2008 | Damera-Venkata et al. |
| 2008/0180467 | A1 | 7/2008 | Jaynes et al. |
| 2009/0262260 | A1 | 10/2009 | Jaynes et al. |
| 2009/0284555 | A1 | 11/2009 | Webb et al. |

FOREIGN PATENT DOCUMENTS

| | | |
|---|---|---|
| WO | WO 2004/092826 | 10/2004 |

OTHER PUBLICATIONS

Notice of Allowance pertaining to U.S. Appl. No. 11/737,823 dated Feb. 17, 2010.

Office Action pertaining to U.S. Appl. No. 11/675,226 dated Feb. 3, 2010.

Office Action pertaining to U.S. Appl. No. 11/737,817 dated Jan. 15, 2010.

Notice of Allowance pertaining to U.S. Appl. No. 11/675,236 dated Apr. 2, 2010.

Notice of Allowance pertaining to U.S. Appl. No. 11/737,817 dated Apr. 8, 2010.

Raskar, Ramesh et al; Seamless Projection Overlaps using Image Warping and Intensity Blending; Fourth International Conference on Virtual Systems and Multimedia; Nov. 1998; pp. 1-5; Gifu, Japan.

Webb, Stephen et al.; The DOME: A Portable Multi-Projector Visualization System for Digital Artifacts; IEEE Workshop on Emerging Display Technologies (w/VR 2005); Mar. 2005; Bonn, Germany.

Harville, Michael et al.; Practical Methods for Geometric and Photometric Correction of Tiled Projector Displays on Curved Surfaces; International Workshop on Projector-Camera Systems (ProCams 2006); Jun. 17, 2006; New York.

Fiala, Mark; Automatic Projector Calibration Using Self-Identifying Patterns; Proceedings of the 2005 IEEE Computer Society Conference on Computer Vision and Pattern Recognition (CVPR'05); 2005.

Griesser, Andreas et al.; Automatic Interactive Calibration of Multi-Projector-Camera Systems; Proceedings of the 2006 Conference on Computer Vision and Pattern Recognition Workshop; 2006.

Rehg, James et al.; Projected Light Displays Using Visual Feedback; Research at Intel; 2003; Intel Corporation.

Office Action pertaining to U.S. Appl. No. 11/737,823 dated Dec. 1, 2009.

U.S. Appl. No. 11/675,226, Notice of Allowance dated Aug. 18, 2010, 9 pages.

U.S. Appl. No. 11/735,258, Office Action dated Jun. 10, 2010, 14 pages.

* cited by examiner

SYSTEM AND METHOD FOR CALIBRATING AN IMAGE PROJECTION SYSTEM

CROSS-REFERENCE TO RELATED APPLICATIONS

This application claims the benefit of U.S. Provisional Application Ser. No. 60/745,343, filed Apr. 21, 2006, incorporated herein by reference. This Application is related to commonly assigned, copending U.S. patent application Ser. Nos. 11/675,226, filed Feb. 15, 2007, 11/735,258, filed Apr. 13, 2007, 11/737,817, filed Apr. 20, 2007, and 11/675,236, filed Feb. 15, 2007.

SUMMARY OF THE INVENTION

The present invention relates to projection systems where one or more projectors are utilized to project a video, a still image, or combinations thereof. More particularly, the present invention relates to methods of calibrating and operating such systems. According to one embodiment of the present invention, a method of operating an image display system is provided. The system comprises one or more projectors oriented to project an image on a projection screen and one or more image sensors oriented to acquire an image projected on the projection screen. According to the method, one or more image fiducials are projected on the image projection screen. Approximate three-dimensional position coordinates of the respective image fiducials as projected on the projection screen are identified by applying one or more three-dimensional mapping functions. The three-dimensional mapping functions represent the manner in which two-dimensional points in a projector frame map to three-dimensional points on a virtual projection screen. One or more parametric functions are fit to a neighborhood of points representing the three-dimensional image fiducial position coordinates and one or more parametric models are generated from the parametric functions. The identified fiducial positions are validated by applying the parametric model to compare the fiducial positions predicted by the parametric model to the approximate fiducial location identified by the three-dimensional mapping function. The projector can be operated in a calibrated projection mode or some other mode that utilizes data obtained from the validation of the identified fiducial positions.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Generally, various embodiments of the present invention relate to calibration techniques that utilize parametric models to generate geometric calibration data to calibrate an image display system including one or more image projectors and one or more image sensors positioned to acquire a projected image, or at least portions thereof. Although the calibration methodology of the present invention has broad applicability to any image projection system where an image or series of images are projected onto a viewing screen using one or more projectors, the methodology of the various embodiments of the present invention is described herein in the context of a multi-projector display system.

Figure 1:
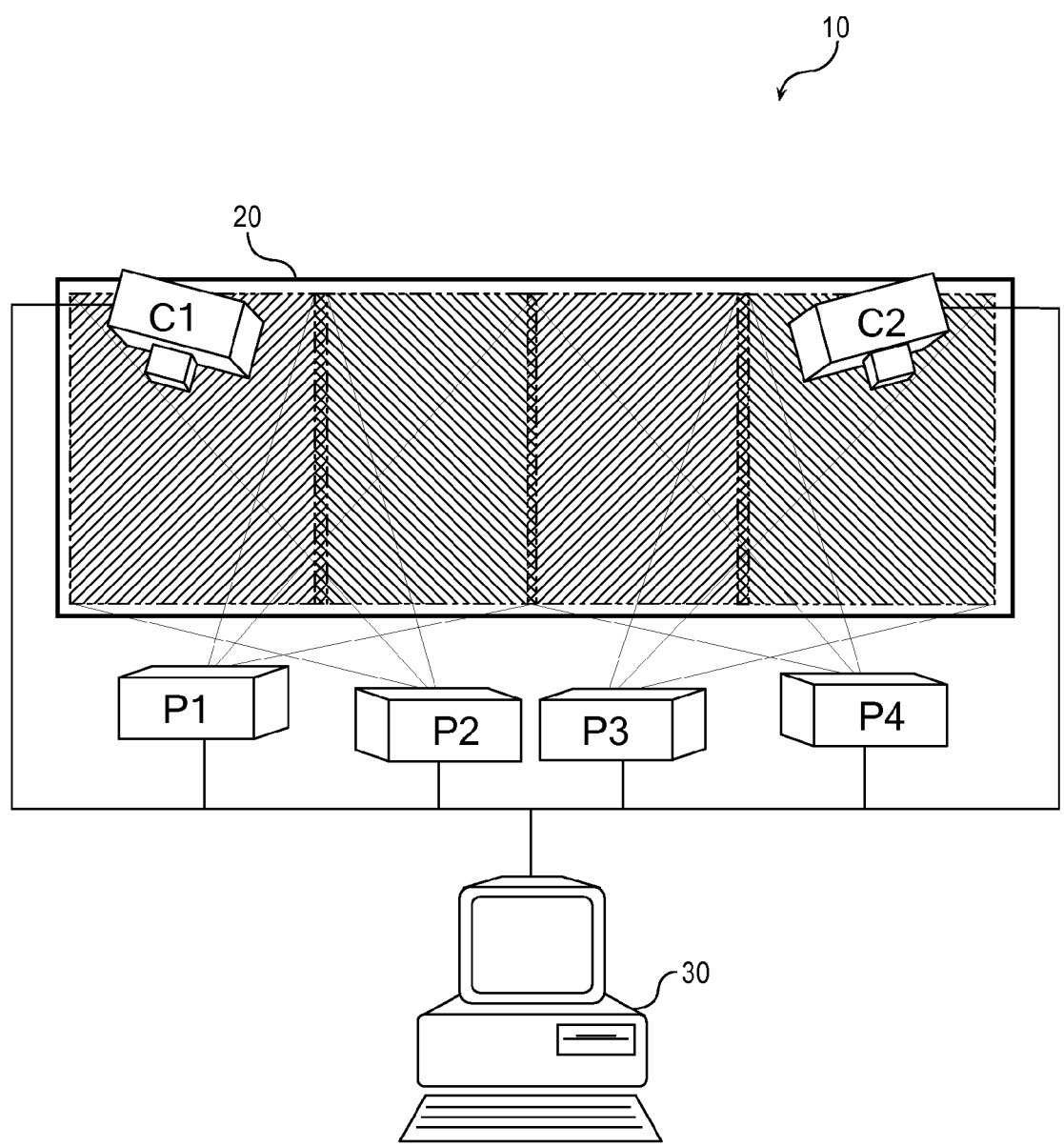
FIG. 1 is a schematic illustration of a projection system according to one or more embodiments of the present invention.

Referring initially to FIG. 1, a calibration method according to one embodiment of the present invention is illustrated in the context of an image display system 10 comprising a plurality of projectors P1, P2, P3, P4 oriented to project an image on a projection screen 20. Two cameras C1, C2 are oriented to acquire the image projected on the projection screen 20. A controller 30, illustrated as a programmable computer, is coupled to the projectors and cameras.

Figure 2:
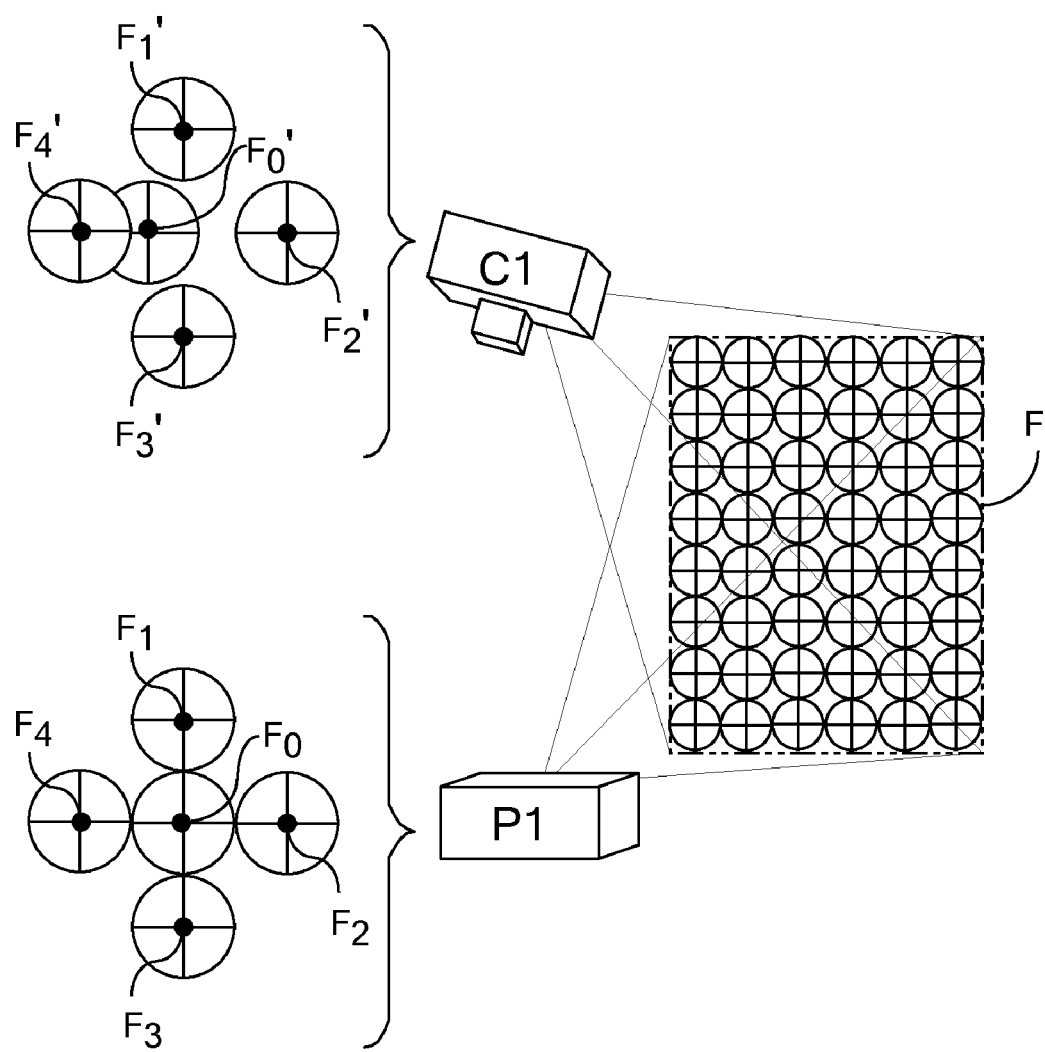
FIG. 2 is a schematic illustration related to image-based projector calibration according to one or more embodiments of the present invention.
Figure 3:
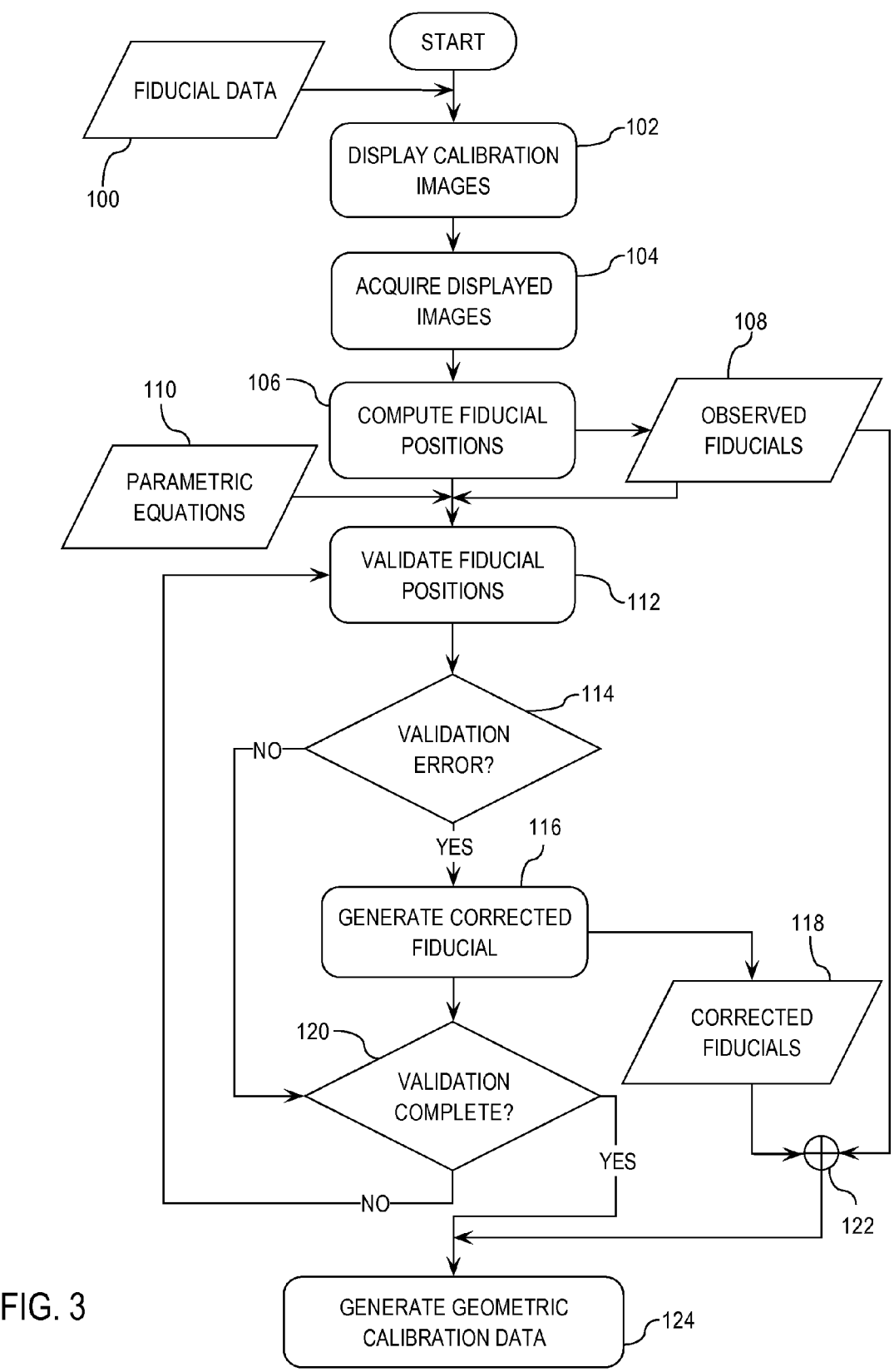
FIG. 3 is a flow chart illustrating calibration methodology according to one or more embodiments of the present invention.

Referring additionally to FIGS. 2 and 3, the projectors are initially operated to project a calibration image comprising a pattern or other representation of image fiducials F on the image projection screen 20 (see input 100 and step 102). Preferably, the geometry of the respective image fiducials F permits reliable identification of the spatial center of each fiducial F or some other spatially consistent reference point of each fiducial F. For example, and not by way of limitation, the respective image fiducials F may comprise circular 2D Gaussian images. In which case, spatially consistent reference points could be established by determining the respective centers-of-mass of the image fiducials or by fitting the parameters of a 2D Gaussian to the observed intensities and determining the maximal point of the Gaussian function. In the illustrated embodiment, the image fiducials F are illustrated as respective circles with two lines intersecting at the center of the circle. To identify a spatially consistent reference point across the set of image fiducials F, an image processing routine could first determine line equations that best fit the observed lines, and then compute the point of intersection of the two lines. In the case of a fiducial with a Gaussian intensity distribution, an image processing routine can first detect the fiducial region and then compute a center of mass of intensity for that region. These points of intersection are illustrated in FIG. 2 and can be used as an estimate of location of each fiducial image F.

For the purposes of describing and defining the present invention, it is noted that a calibration image may define a specific pattern of image fiducials F or may merely comprise an image for which feature locations within the image are known and are distinguishable in the camera. Indeed, reference herein to "image fiducials F" should be read broadly to cover any aspect of a calibration image that can be used to help identify feature locations within the image. A calibration image and the corresponding image fiducials F therein need not be limited to specific types of formal calibration images.

Once the image fiducials have been displayed, the cameras C1, C2, or other types of conventional or yet-to-be developed image sensors, are operated to acquire the projected calibration image including the image fiducials F as projected on the projection screen 20 (see step 104). As is noted above, the respective positions of the image fiducials F within the pattern of fiducials as projected on the projection screen 20 can be calculated or otherwise identified collectively or on a fiducial-by-fiducial basis by suitable image processing software (see step 106 and output 108). As is illustrated in FIG. 2, because fiducial identification processes are commonly subject to measurement error arising from ambient lighting non-uniformity, irregularities in the display surface geometry, and irregularities in reflectance properties, the identified position of a given fiducial $F_0'$ relative to a set of neighboring fiducials $F_1'$-$F_4'$ in the image acquired by the camera C1 can vary significantly from the position of the fiducial $F_0$ relative to a set of neighboring fiducials $F_1$-$F_4$ defined by the projector P1. Although this type of measurement error can lead to visibly noticeable calibration/registration error in a wide variety of single and multi-projector display systems, it is particularly acute in display systems where two or more projectors are used to form a single, geometrically consistent image. According to one aspect of the present invention, this measurement error can be mitigated by using local parametric models to provide an estimate of the image measurement error for a given fiducial F. Further, the local parametric models and the estimate of the image measurement error may form a basis for replacing erroneous or missing measurements with values that conform to the model.

The fiducial positions identified in step 106 are validated to identify erroneous or missing image fiducials F in the acquired calibration image. To validate the fiducials, a parametric model is applied to compare respective ones of the identified fiducial positions with corresponding approximations of the identified fiducial positions (see inputs 108, 110 and step 112). As is illustrated in FIG. 2, the respective approximations that are used in the fiducial validation step can be calculated or otherwise determined by using positional data acquired for a neighborhood of image fiducials $F_1'$-$F_4'$ in the calibration image acquired by the camera C1, as projected on the projection screen 20. More specifically, the neighborhood of image fiducials $F_1'$-$F_4'$ are used in combination with a suitable local parametric model to approximate the identified fiducial position $F_0'$. To minimize error, the identified fiducial position $F_0'$ is excluded from the set of neighboring image fiducials $F_1'$-$F_4'$ when approximating the identified fiducial position $F_0'$.

The local parametric model used in the validation step preferably represents a mapping of the calibration image from the image projector P1 to the image sensor C1. More specifically, the parametric model can comprise one or more functions that are configured to predict the positions of individual image fiducials in a 2D frame of the image sensor C1 and can be created in a number of ways. For example, and not by way of limitation, the parametric functions can be created by applying (i) a least squares approximation to a neighborhood of image fiducials in the calibration image, (ii) a Levenberg-Marquardt algorithm parametric optimization technique, (iii) a simulated-annealing parametric optimization technique, (iv) a gradient descent parametric optimization technique, or combinations thereof.

In cases where the parametric functions are created by applying a least squares approximation to the neighborhood of image fiducials $F_1'$-$F_4'$ in the calibration image. In many cases, the parametric models will be derived from one or more dual variable, low order polynomials. For example, the following two-degree polynomial of the variables Px and Py could be used to approximate the 2D positions in the camera image of a projector point for a variety of projection screen geometries:

$$C_x = f(P_x, P_y)$$

$$C_y = g(P_x, P_y)$$

where $C_x$ and $C_y$ represent the x and y coordinates of a point in the image sensor frame, $P_x$ and $P_y$ represent the x and y coordinates of a point in the projector frame, and f and g represent coefficient scalars. Other functions that include constraints about the expected positions of points relative to one another can be used in the presence of additional information about the screen surface, radiometric properties of the display surface, or other auxiliary information. For example, linear homography techniques can be used to determine how points on a planar display surface will be observed using a projective sensing device such as a camera. This type of parametric model would have eight degrees of freedom and would be represented by a non-singular homogeneous 3×3 matrix resulting in a set of parametric equations.

In order to use the parametric equations to validate fiducial image locations, the parameters to the function should first be determined and, for each term in the polynomial function, a coefficient scalar value should be computed or, where linear homography techniques are used, the 8 free parameters of the matrix would need to the discovered. These coefficients can be computed by using a standard least-squares approximation technique. In order to compute the least squares approximation, first a neighborhood of fiducial points is chosen, and the corresponding projector and camera coordinates for each point in the neighborhood is added to a list. This list of (Px, Py)→(Cx, Cy) point correspondences represents input to output mappings that should be produced by the functions. By applying the least-squares estimation technique to these data, a function of best fit can be determined.

It is contemplated that several different parametric models can be fit to the local neighborhood of points in the case where an accurate parametric model is unavailable or unknown. In this case, the function of best fit both determines the parameters of the function as well as the parametric model that best describes the local neighborhood of fiducal locations.

For a given fiducial F that is in the projector frame buffer, a function is fit to the points in some neighborhood of F, but not including F. This function can then be used to predict the camera position of the image of F. If the observed position of the image of F differs from the predicted position by more than some minimum value, then a validation error is acknowledged (see step 114). The parametric models used in the validation process can be configured to account for the geometry of the projection screen, the projector geometry, or a combination thereof. Further, the particular parametric models used in validation may vary depending on the projected position of the image fiducial to be validated.

As is noted above, once a validation error is acknowledged or otherwise certified, a corrected fiducial can be generated and used to replace the observed image fiducial $F_0$ (see step 116). More specifically, the validation routine can be configured such that an error threshold determines when an observed fiducial is retained or replaced. Typically, the error threshold represents a distance metric between an identified fiducial position and an approximation of the identified fiducial position. The error threshold may be fixed or may vary as the projected positions of the image fiducials to be validated vary. One example of how a dynamic threshold value can be computed is to use the residual fit error of a least-squares approximation. This value can be related to how well the parametric function fits the input data, with lower values indicating a better fit.

The corrected fiducial positions generated at output 118 in FIG. 3 can be determined with reference to a fixed or dynamic correction factor. For example, the approximations of the identified fiducial positions can be used as the corrected fiducial positions or can at least form a partial basis for defining the corrected fiducial positions. It is also contemplated that the corrected fiducial positions can be computed as a combination of the identified fiducial positions and the approximations of the identified fiducial positions, i.e., by taking an average of the respective positions, an average weighted by the residual fit error, etc. In any case, geometric calibration data is constructed for the projector using corrected fiducial positions (see output 118) in place of fiducial positions for which errors have been certified. In the illustrated embodiment, an OR logic function 122 or other suitable routine is used to combine validated fiducial positions, as represented in the observed fiducials (see output 108), and the corrected fiducial positions generated in step 116 to generate a complete set of geometric calibration data for the projector (see step 124). This geometric calibration data is used to operate the projector in a calibrated projection mode.

As is noted above, the concepts of the present invention are equally applicable to single and multiple projector image display systems. Accordingly, it is contemplated that multiple projector image display systems incorporating aspects of the present invention can additionally be configured to include execution of conventional or yet-to-be developed multi-projector intensity blending routines.

As is noted above, the parametric models discussed herein can also be used to generate corrected image fiducials F that can be used to replace missing image fiducials when an image fiducial is not present in the acquired calibration image. To do so, the corrected fiducial position can be approximated from a neighborhood of image fiducials present in the calibration image, as projected on the projection screen, as long as a sufficient number of neighborhood points can be observed to ensure a minimum degree of accuracy.

Figure 4:
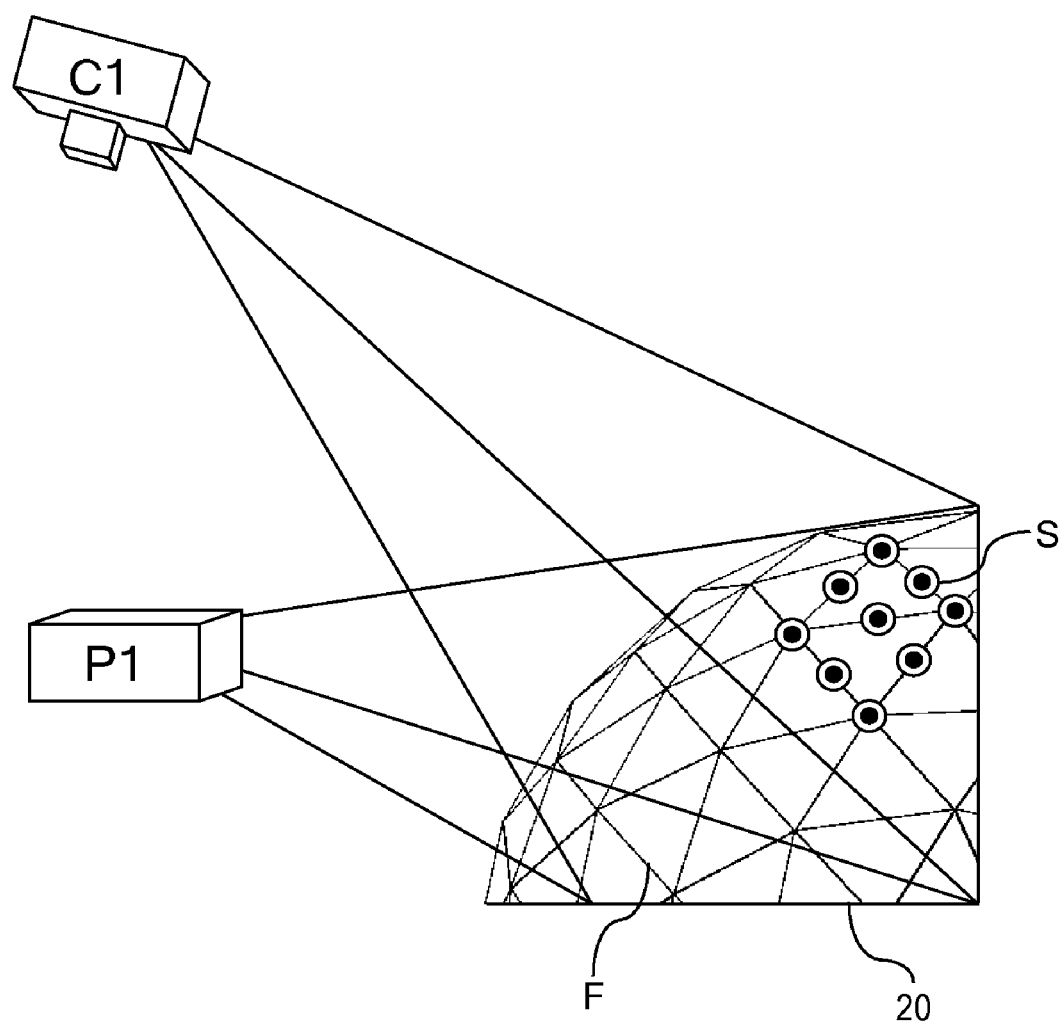
FIG. 4 is a schematic illustration of a projection system according to additional embodiments of the present invention.
Figure 5:
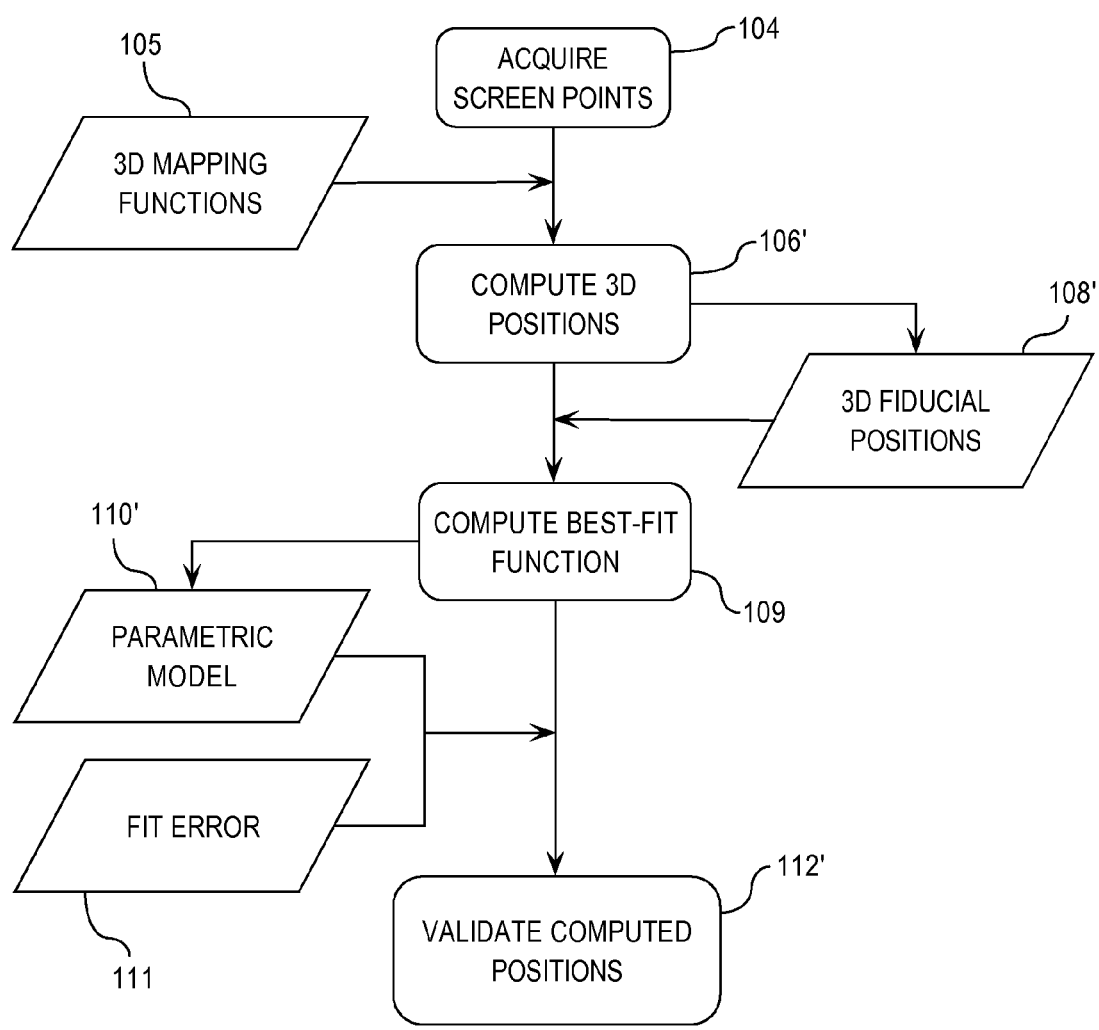
FIG. 5 is a flow chart illustrating calibration methodology according to one or more additional embodiments of the present invention.

An additional embodiment of the present invention is illustrated in FIGS. 4 and 5 with reference to a single camera/projector pair C1/P1, a virtual model 25 of a spherical projection screen, and a plurality of image fiducials F as they would be projected on the three-dimensional surface defined by the virtual screen 25. The image fiducials F are actually projected on a roughly spherical projection screen that is not shown in FIG. 4. The geometry of the actual projection screen is approximated using a parametric model that fits the screen.

In the embodiments of the present invention illustrated above with reference to FIGS. 1-3, the respective positions of the image fiducials projected on the projection screen were validated utilizing a parametric model that mapped two-dimensional projector points to two-dimensional camera points. In contrast, validation routines according to the additional embodiments of the present invention illustrated in FIGS. 4 and 5, map two-dimensional projector points to a three-dimensional cloud of virtual screen points $V_s$. For convenience of illustration, the image fiducials F are merely illustrated schematically in FIG. 4 with no representation of the actual geometry of the image fiducials F.

The aforementioned mapping from two-dimensional fiducial image locations to their position in a three-dimensional coordinate system can be accomplished by computing the inverse geometric mapping determined by the sensor and using an appropriate model of the display surface. In the case of a standard projective camera, this mapping could be represented as a 4×4 homogeneous projection matrix that is the inverse of the linear image formation process. Two-dimensional points multiplied by this matrix give rise to a ray that emanates from the camera center and passes through the image point. In this case, a three-dimensional point corresponding to the two-dimensional image fiducial is derived by computing the intersection of this ray with an appropriate model of the display surface. It is contemplated that this approach is not limited to linear relationships between two and three-dimensional points and that nonlinear distortion models can also be applied.

It should be noted that the present invention does not require that parameters of the model reflect the physical parameters of the system. For example, although the 4×4 projection matrix corresponding to a camera is determined in part by the camera focal length, image center, and other parameters, in most cases, a set of parameters that can be used to determine the two-dimensional to three-dimensional mapping is all that is required. In addition, the parameters chosen for the virtual display surface 25 do not necessarily need to reflect the actual physical display surface. Rather, if the parameterization of the display surface is appropriate, then the actual parameters are unimportant. For example, if the physical display surface can be described by a spherical parameterization, a quadric equation and its associated parameters may be sufficient to yield suitable results.

More specifically, referring to FIGS. 4 and 5, the projector P1 is operated to project a calibration image in the manner described above with reference to FIGS. 1-3. Similarly, the camera C1 is operated to acquire the projected calibration image as would be projected on the virtual screen 25 (see step 104). These and other similarities to the flow chart of FIG. 3 are represented in the flow chart of FIG. 5 through the use of like reference numbers for like block elements. For example, the image and virtual screen point acquisition steps illustrated in FIGS. 3 and 5 are each identified with reference number 104 because both relate to image acquisition via image sensors. Block elements in FIG. 5 that replace similar functionality represented in FIG. 3 have been delineated with the use of the corresponding reference number from FIG. 3 and the addition of a special punctuation following particular reference numbers in FIG. 5 (see, e.g., steps 106', 108', 110', 112'). Steps appearing for the first time in the flow chart of FIG. 5 and not being readily identifiable with steps presented in the flow chart of FIG. 3 have been delineated with new reference numbers (see, e.g., steps 105, 109, 111).

As is noted above, the embodiments of the present invention illustrated with reference to FIGS. 4 and 5 differ from those illustrated with reference to FIGS. 1-3 with respect to the manner in which the position coordinates of the image fiducials are identified. Specifically, in FIGS. 4 and 5, respective three-dimensional position coordinates of the image fiducials F, as would be projected on the virtual screen 25 are identified by applying one or more three-dimensional mapping functions (see input 105 and step 106'). These three-dimensional mapping functions represent the manner in which two-dimensional points in a projector frame map to three-dimensional points on the virtual projection screen 25 and are used to generate a set of three-dimensional fiducial positions (see step 108'). Once the set of three-dimensional fiducial positions have been generated, one or more three-dimensional parametric functions are fit to a neighborhood of fiducial points $V_s$ (see step 109). These parametric functions represent the known spatial constraints of points given the parameterization of the display surface. For example three-dimensional parametric functions could include three-dimensional planar equations, three-dimensional spheres, quadrics, or constrained three-dimensional splines. These best-fit functions are used to generate one or more parametric models (see step 110') and the parametric models are used to validate the fiducial positions previously identified in steps 106' and 108' (see steps 112'). The validation process can be further modified by a fit error routine to help account for error in the process of fitting the parametric functions to the point cloud defined by the neighborhood of points $V_S$.

The validation process of FIGS. 4 and 5 is analogous to that illustrated above with respect to FIGS. 1-3 in the sense that the parametric model is used to generate approximations of the identified fiducial positions. These approximations are then compared to respective ones of the identified fiducial positions and validation errors are certified when a result of one of the comparisons exceeds an error threshold. Geometric calibration data is generated and used for the projector using validated and corrected fiducial positions in the manner similar to that illustrated above with respect to FIGS. 1-3. More specifically, the corrected fiducial positions can be determined with reference to a fixed or dynamic correction factor. For example, the approximations of the identified fiducial positions can be used as the corrected fiducial positions or can at least form a partial basis for defining the corrected fiducial positions. It is also contemplated that the corrected fiducial positions can be computed as a combination of the identified fiducial positions and the approximations of the identified fiducial positions, i.e., by taking an average of the respective positions, an average weighted by the residual fit error, etc.

Accordingly, the aspect of the present invention described herein with reference to FIGS. 4 and 5 is similar to the image-based parametric model fitting procedure described with reference to FIGS. 1-3. However, the technique operates on three-dimensional point clouds to inspect local neighborhoods of points to determine how consistent these points are to a local model. In the calibration routines of FIGS. 1-3, two-dimensional projector points are mapped to two-dimensional camera points. In contrast, the calibration methods illustrated with reference to FIGS. 4 and 5 utilize functions that map two-dimensional projector points to three-dimensional virtual screen points and can be used when three-dimensional position estimates are known for the fiducial points. The technique involves computing a best fit parametric function to a local neighborhood of points and then using this function (along with fit error) to validate the computed positions of fiducial points.

It is noted that FIG. 4 illustrates embodiments of the present invention with reference to a single camera/projector pair C1/P1 and a spherical projection screen merely for convenience and clarity. It is contemplated that the inventive concepts illustrated with reference to FIG. 4 have broad applicability to display systems incorporating more complex projection and image sensing configurations and a wide variety of three-dimensional screen configurations including, but not limited to, spheres, cylinders, planes, quadrics, etc.

It is noted that recitations herein of a component of the present invention being "configured" or "programmed" to embody a particular property, function in a particular manner, etc., are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an image display system comprising one or more projectors oriented to project an image on a projection screen and one or more image sensors oriented to acquire an image projected on the projection screen, the method comprising:
    operating the projector to project a calibration image comprising one or more image fiducials on the image projection screen;
    operating the image sensor to acquire the projected calibration image including the image fiducials as projected on the projection screen;
    identifying approximate three-dimensional position coordinates of the respective image fiducials as projected on the projection screen by applying one or more three-dimensional mapping functions, wherein the three-dimensional mapping functions represent the manner in which two-dimensional points in a projector frame map to three-dimensional points on a virtual approximation of the projection screen;
    fitting one or more parametric functions to a neighborhood of points representing the approximate three-dimensional image fiducial position coordinates;
    generating one or more parametric models from the parametric functions fit to the neighborhood of points;
    validating the identified fiducial positions by applying the parametric model to compare approximations of the fiducial positions predicted by the parametric model with respective ones of the fiducial positions identified with the three-dimensional mapping functions; and
    operating the projector in a manner that is at least partially dependent on the result of the validation of the identified fiducial positions.

2. A method as claimed in claim 1 wherein the projector is operated to project a calibration image comprising a three-dimensional pattern of image fiducials and the approximate three-dimensional position coordinates of the respective image fiducials within the pattern are identified.

3. A method as claimed in claim 1 wherein the method further comprises certifying validation errors and generating corrected fiducial positions when a result of one of the comparisons exceeds an error threshold.

4. A method as claimed in claim 3 wherein the method further comprises generating geometric calibration data for the projector using validated fiducial positions and corrected fiducial positions in place of fiducial positions for which errors are certified.

5. A method as claimed in claim 4 wherein the method further comprises utilizing the geometric calibration data to operate the projector in the calibrated projection mode.

6. A method as claimed in claim 3 wherein the error threshold at least partially accounts for error in fitting the parametric functions to the neighborhood of points representing the approximate three-dimensional image fiducial position coordinates.

7. A method as claimed in claim 3 wherein the corrected fiducial positions are determined with reference to a fixed or dynamic correction factor.

8. A method as claimed in claim 3 wherein the corrected fiducial positions are at least partially a function of the approximations of the identified fiducial positions.

9. A method as claimed in claim 3 wherein the approximations of the identified fiducial positions are used as the corrected fiducial positions.

10. A method as claimed in claim 3 wherein respective combinations of identified fiducial positions and approximations of the identified fiducial positions are used as the corrected fiducial positions.

11. A method as claimed in claim 1 wherein the approximation of the identified fiducial position used in validation is determined from a three-dimensional neighborhood of image fiducials in the calibration image.

12. A method as claimed in claim 1 wherein the projector is operated in a calibrated projection mode by utilizing data obtained from the validation of the identified fiducial positions.

13. An image display system comprising one or more projectors oriented to project an image on a projection screen, one or more image sensors oriented to acquire an image projected on the projection screen, and one or more controllers programmed to calibrate the projectors, wherein the controller is programmed to:

operate the projector to project a calibration image comprising one or more image fiducials on the image projection screen;

operate the image sensor to acquire the projected calibration image including the image fiducials as projected on the projection screen;

identify approximate three-dimensional position coordinates of the respective image fiducials as projected on the projection screen by applying one or more three-dimensional mapping functions, wherein the three-dimensional mapping functions represent the manner in which two-dimensional points in a projector frame map to three-dimensional points on a virtual approximation of the projection screen;

fit one or more parametric functions to a neighborhood of points representing the approximate three-dimensional image fiducial position coordinates;

generate one or more parametric models from the parametric functions fit to the neighborhood of points;

validate the identified fiducial positions by applying the parametric model to compare approximations of the fiducial positions predicted by the parametric model with respective ones of the fiducial positions identified with the three-dimensional mapping functions; and operate the projector in a manner that is at least partially dependent on the result of the validation of the identified fiducial positions.

14. An image display system as claimed in claim 13 wherein the controller is further programmed to operate the projector in a calibrated projection mode by utilizing data obtained from the validation of the identified fiducial positions.

15. An image display system as claimed in claim 13 wherein the controller is further programmed to certify validation errors and generate corrected fiducial positions when a result of one of the comparisons exceeds an error threshold.

16. An image display system as claimed in claim 15 wherein the controller is further programmed to generate geometric calibration data for the projector using validated fiducial positions and corrected fiducial positions in place of fiducial positions for which errors are certified.

17. An image display system as claimed in claim 16 wherein the controller is further programmed to utilize the geometric calibration data to operate the projector in the calibrated projection mode.

* * * * *